United States Patent
Carbonera et al.

(10) Patent No.: US 8,515,713 B2
(45) Date of Patent: *Aug. 20, 2013

(54) SYSTEM AND METHOD FOR EMBELLISHMENT PLACEMENT

(75) Inventors: Carlos D. Carbonera, St. Paul, MN (US); Yuriy Malinin, Edina, MN (US)

(73) Assignee: Jostens, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/353,465

(22) Filed: Jan. 19, 2012

(65) Prior Publication Data

US 2012/0116729 A1   May 10, 2012

Related U.S. Application Data

(63) Continuation of application No. 12/047,149, filed on Mar. 12, 2008, now Pat. No. 8,126,683.

(60) Provisional application No. 60/894,362, filed on Mar. 12, 2007.

(51) Int. Cl.
 *G06F 17/50* (2006.01)
(52) U.S. Cl.
 USPC ............ 703/1; 700/98; 700/117; 434/81; 434/386
(58) Field of Classification Search
 USPC .................................................. 703/1
 See application file for complete search history.

(56) References Cited

U.S. PATENT DOCUMENTS

| | | |
|---|---|---|
| 2,858,897 A | 11/1958 | Kraemer |
| 3,964,915 A | 6/1976 | Doenges et al. |
| 4,004,333 A | 1/1977 | Daniels |
| 4,561,061 A | 12/1985 | Sakamoto et al. |
| 4,630,309 A | 12/1986 | Karow |
| 4,761,865 A | 8/1988 | Magnien |
| 4,771,474 A | 9/1988 | Takashima et al. |
| 4,918,611 A | 4/1990 | Shyu et al. |
| 4,969,201 A | 11/1990 | Takasaki et al. |
| 4,972,323 A | 11/1990 | Cauwet |
| 5,003,498 A | 3/1991 | Ota et al. |
| 5,007,098 A | 4/1991 | Kumagai |
| 5,116,174 A | 5/1992 | Fried et al. |
| 5,249,670 A | 10/1993 | Simon |

(Continued)

FOREIGN PATENT DOCUMENTS

| | | |
|---|---|---|
| FR | 2536969 | 6/1984 |
| FR | 2829366 | 3/2003 |

(Continued)

OTHER PUBLICATIONS

Wannarumon et al, "Rapid Prototyping and Tooling Technology in Jewelry CAD", Computer-Aided Design and Applications, Vol, 1, No. 1-4, pp. 569-575, 2004.*

(Continued)

*Primary Examiner* — Mary C Jacob
(74) *Attorney, Agent, or Firm* — Winthrop & Weinstine, P.A.

(57) ABSTRACT

A method for embellishment placement may include receiving a parameter value defining a minimum distance between an embellishment and another feature of the item, defining points on the item, randomizing the points, eliminating one or more points based on the parameter value and leaving remaining points, the remaining points defining the positions for embellishments on the item, and manufacturing the item.

15 Claims, 5 Drawing Sheets

(56) References Cited

U.S. PATENT DOCUMENTS

| | | | |
|---|---|---|---|
| 5,261,768 | A | 11/1993 | Loucks et al. |
| 5,329,381 | A | 7/1994 | Payne |
| 5,369,736 | A | 11/1994 | Kato et al. |
| 5,473,742 | A | 12/1995 | Polyakov et al. |
| 5,544,291 | A | 8/1996 | Gilley et al. |
| 5,548,698 | A | 8/1996 | Smith et al. |
| 5,569,003 | A | 10/1996 | Goldman et al. |
| 5,587,913 | A | 12/1996 | Abrams et al. |
| 5,649,079 | A | 7/1997 | Holmes |
| 5,668,930 | A | 9/1997 | Hamura et al. |
| 5,689,577 | A | 11/1997 | Arata |
| 5,739,822 | A | 4/1998 | Paradine |
| 5,739,912 | A | 4/1998 | Ishii |
| 5,790,713 | A | 8/1998 | Kamada et al. |
| 5,850,222 | A | 12/1998 | Cone |
| 5,926,388 | A | 7/1999 | Kimbrough et al. |
| 5,926,389 | A | 7/1999 | Trounson |
| 5,968,564 | A | 10/1999 | Welsh et al. |
| 5,977,007 | A | 11/1999 | Lassow et al. |
| 6,003,228 | A | 12/1999 | Riggio |
| 6,083,267 | A | 7/2000 | Motomiya et al. |
| 6,085,126 | A | 7/2000 | Mellgren, III et al. |
| 6,101,280 | A | 8/2000 | Reynolds |
| 6,124,858 | A | 9/2000 | Ge et al. |
| 6,138,055 | A | 10/2000 | Pryor |
| 6,181,839 | B1 | 1/2001 | Kannon et al. |
| 6,249,289 | B1 | 6/2001 | Arnaud et al. |
| 6,260,383 | B1 | 7/2001 | Warren et al. |
| 6,300,595 | B1 | 10/2001 | Williams |
| 6,349,758 | B1 | 2/2002 | Bell |
| 6,407,361 | B1 | 6/2002 | Williams |
| 6,434,277 | B1 | 8/2002 | Yamada et al. |
| 6,546,305 | B1 | 4/2003 | Hruby |
| 6,568,455 | B2 | 5/2003 | Zieverink |
| 6,600,488 | B1 | 7/2003 | Moreton et al. |
| 6,628,279 | B1 | 9/2003 | Schell et al. |
| 6,763,279 | B2 | 7/2004 | Davis |
| 6,856,314 | B2 | 2/2005 | Ng |
| 6,877,916 | B2 | 4/2005 | Khaikin |
| 6,978,230 | B1 | 12/2005 | Klosowski et al. |
| 6,982,710 | B2 | 1/2006 | Salomie |
| 7,003,371 | B2 | 2/2006 | Tsuchida et al. |
| 7,006,089 | B2 | 2/2006 | Baumberg |
| 7,069,108 | B2 | 6/2006 | Saarela et al. |
| 7,091,963 | B2 | 8/2006 | Dresevic et al. |
| 7,236,180 | B2 | 6/2007 | Dresevic et al. |
| 7,593,786 | B2 | 9/2009 | Saarela et al. |
| 7,747,055 | B1 | 6/2010 | Vining et al. |
| 7,856,285 | B2 | 12/2010 | Carbonera et al. |
| 8,085,266 | B2 | 12/2011 | Carbonera et al. |
| 8,126,683 | B2 | 2/2012 | Carbonera et al. |
| 2001/0044668 | A1 | 11/2001 | Kimbrough et al. |
| 2002/0063912 | A1 | 5/2002 | Barbanell |
| 2002/0085748 | A1 | 7/2002 | Baumberg |
| 2002/0092322 | A1 | 7/2002 | Zieverink |
| 2002/0113865 | A1 | 8/2002 | Yano et al. |
| 2002/0128742 | A1 | 9/2002 | Zieverink |
| 2002/0159638 | A1 | 10/2002 | Ratner et al. |
| 2002/0181802 | A1 | 12/2002 | Peterson |
| 2002/0191863 | A1 | 12/2002 | Biermann et al. |
| 2004/0091143 | A1 | 5/2004 | Hu |
| 2004/0111178 | A1 | 6/2004 | Saarela et al. |
| 2004/0237822 | A1 | 12/2004 | Boland et al. |
| 2005/0089237 | A1 | 4/2005 | Park et al. |
| 2005/0147312 | A1 | 7/2005 | Chen |
| 2005/0149409 | A1 | 7/2005 | Whaley |
| 2005/0222862 | A1 | 10/2005 | Guhde et al. |
| 2006/0001664 | A1 | 1/2006 | Carbonera |
| 2006/0200269 | A1 | 9/2006 | Saarela et al. |
| 2006/0290695 | A1 | 12/2006 | Salomie |
| 2008/0177410 | A1 | 7/2008 | Carbonera |
| 2008/0229784 | A1 | 9/2008 | Carbonera et al. |
| 2009/0110307 | A1 | 4/2009 | Markowitz |
| 2009/0263624 | A1 | 10/2009 | Illston |
| 2010/0152873 | A1 | 6/2010 | Dunne et al. |
| 2010/0169059 | A1 | 7/2010 | Thomas-Lepore et al. |
| 2011/0144785 | A1 | 6/2011 | Carbonera et al. |
| 2011/0213482 | A1 | 9/2011 | Saarela et al. |
| 2012/0075297 | A1 | 3/2012 | Carbonera et al. |

FOREIGN PATENT DOCUMENTS

| | | |
|---|---|---|
| FR | 2880521 | 7/2006 |
| JP | 2003150666 | 5/2003 |
| WO | 0057254 | 8/2000 |
| WO | 0193156 | 12/2001 |
| WO | 2004053653 | 6/2004 |

OTHER PUBLICATIONS

"2004 Your Guide to feature-based Manufacturing", Jun. 2003, Engineering Geometry Systems, Tenth Edition, pp. 13-66, 153-182, 291-298, 311-342, 369, 380, 441-457.

International Search Report for PCT Application No. PCT/US2005/013469, mailed Sep. 6, 2005.

Sigmund et al. "Transformations between Pictures from 2D to 3D", Jun. 2000, Journal of Intelligent and Robotic Systems, vol. 28, pp. 69-84.

Hendricks, Bob. "Henricks Mfg. Jewellers-CNC Production of Wax Models Boosts Ring Sales by 50%", www.techno-isel.com/CNC_Routers/Testimonials/Articles/Hendricks.htm, Nov. 25, 2001.

Wirth, Joachim "Rapid Modeling", Carl Hanser Verlag, Munchen, 2002, pp. 60-62, 170-177.

International Search Report and Written Opinion. International Patent Application No. PCT/US2008/056705. Mailed Apr. 8, 2008.

Techjewel, "TechGems 3.0", User Guide, 2004.

Stamati et al. "A Parametric Feature-based CAD System for Reproducing Traditional Pierced Jewellery", Computer-Aided Design, vol. 37, Issue 4, pp. 431-449, Apr. 2004.

Wannarumon et al. "Intelligent Computer System for Jewelry Design Support", Computer Aided Design and Applications, 1 (1-4) 551-558, 2004.

Rowan, Mark, "Automated Methods for Evolutionary Pave Jewellery Design", The University of Birmingham School of Computer Science, Jan. 15, 2006.

Delcam plc, "ArtCAM JewelSmith User Gu de", Issue 7.1 Sep. 11, 2004.

English Abstract of Japanese Publication No. 2003150666 published on May 23, 2003. Patent Abstracts of Japan, vol. 2003, No. 9, Sep. 3, 2003 (1 page).

Wick et al. "Tool and Manufacturing Engineers Handbook", 1998, Society of Manufacturing Engineers, vol. 3, Chapter 15 (pp. 15-1, 15-2, and 15-25).

Park, Sang C. "Polygonal extrusion", The Visual Computer, Jan. 28, 2003, Springer-Verlag, pp. 38-49.

Stam, Jos et al. "Quad/Triangle Subdivision", Computer Graphics Forum, vol. 22, No. 1, Apr. 2003, pp. 79-85.

* cited by examiner

SYSTEM AND METHOD FOR EMBELLISHMENT PLACEMENT

CROSS-REFERENCE TO RELATED APPLICATIONS

This application is a continuation of U.S. patent application Ser. No. 12/047,149, filed Mar. 12, 2008, now U.S. Pat. No. 8,126,683, which claims priority to U.S. Provisional Patent Application No. 60/894,362 filed on Mar. 12, 2007, the entire contents of each of which are hereby incorporated by reference herein in their entireties.

FIELD

The present invention relates to a method for embellishment placement and, more specifically, to an automated method for determining positions for embellishments placement for items such as jewelry.

BACKGROUND

Embellishments, such as stones or beads (raised portions of metal on a like metal substrate) are frequently used to decorate jewelry items such as rings, bracelets, necklaces, pendants, earrings, etc. In many cases, such as championship rings, it is desirable to have a plurality of small stones 12, such as shown in the ring 10 of FIG. 1, to create visual impact. Similar visual impact can alternatively be created by providing metal beads 22 along the surface of the ring 20, such as shown in FIG. 2. Regardless of the type of embellishment provided, for example stones or beads, it is often desirable that the placement of the embellishments fills the space on the ring and appears random.

Generally, to create placement positions for embellishments, a designer manually determines placement of each individual embellishment. Such manual determination is time-consuming and costly. Therefore, a need exists for an automated process for determining embellishment placement.

BRIEF SUMMARY

A method for embellishment placement is provided. More specifically, an automated method for determining placement of embellishments for jewelry items is provided.

In one embodiment, a method for determining positions for embellishment placement on an item is provided. The method comprises determining and setting values for at least one parameter, setting points on the item and randomizing the points. The method further comprises eliminating points based on the at least one parameter and using the remaining points as positions for embellishments.

In another embodiment, a method for determining positions for embellishment placement on a ring is provided. The method includes providing a ring face having a perimeter and a center boundary, determining at least one parameter, and setting values for the at least one parameter. The method further includes creating offsets along the ring face, setting points on the offsets, and randomizing the points. The method then includes eliminating points based on the at least one parameter and using remaining points as positions for embellishments.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

DETAILED DESCRIPTION

Figure 1:
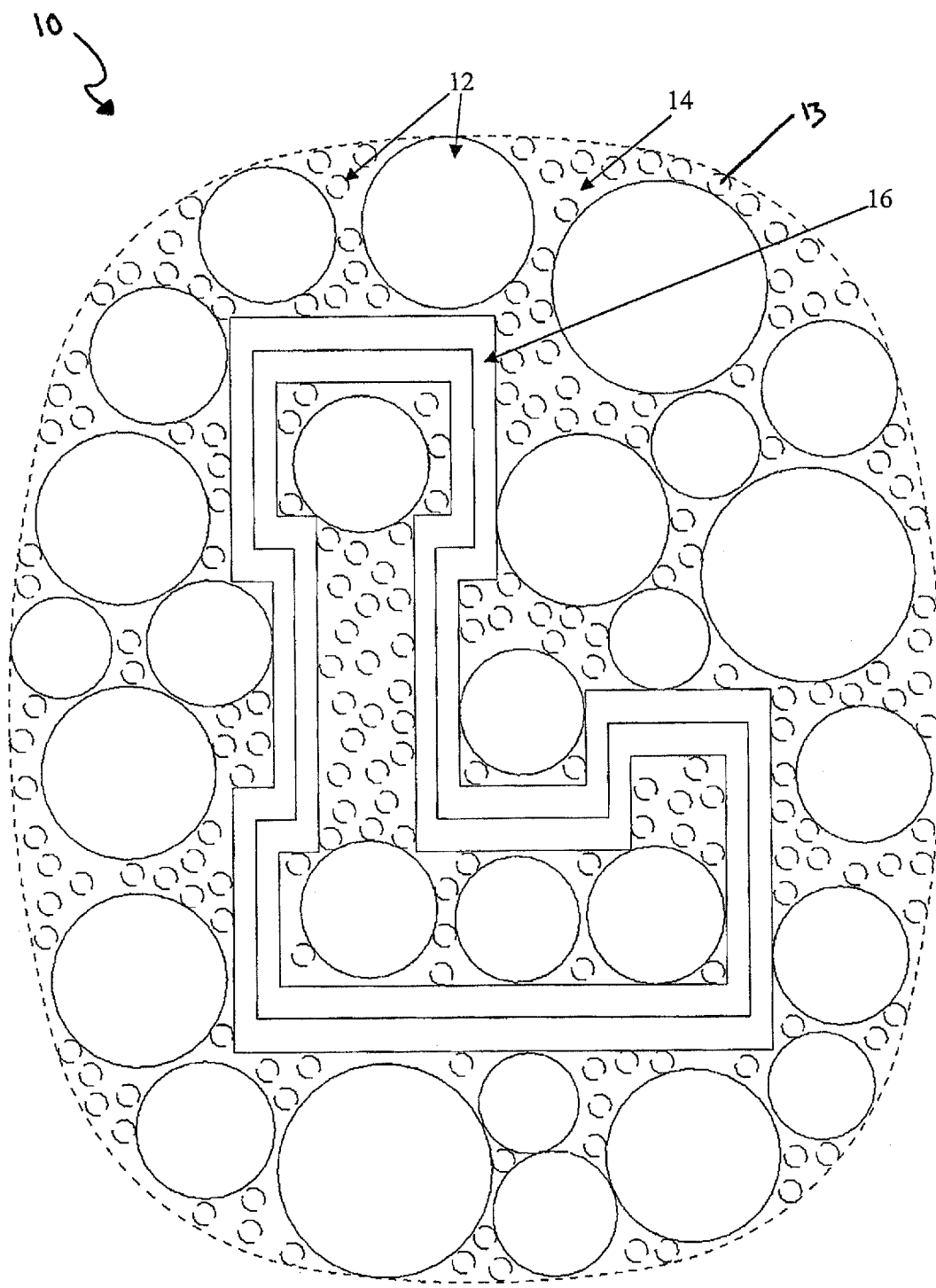
FIG. 1 illustrates a ring having a decorative feature and a plurality of stones on the face thereof.

A method for embellishment placement is provided. More specifically, an automated method for determining placement of embellishments for items, such as jewelry items, is provided. Jewelry items, such as rings, often have a face that has one or more decorative features. In addition to a focal point, such as a large stone, letter, or icon, a plurality of small embellishments, such as stones or beads, may be provided on the face. FIG. 1 illustrates a ring 10 having a decorative feature 16 provided on its face 14. In addition to the decorative feature 16, a letter in FIG. 1, the ring includes a plurality of small stones 12 and beads 13. The decorative feature 16 may be a custom decorative detail such as a stone, a feature where paint, such as enamel paint, may be added, a detail that may be fixed in tooling, a letter or icon that may be filled with paint or may contain stones, etc. The beads 13 may comprise metallic knobs formed of the same metal as the substrate item. The beads 13 thus may add shininess and decoration similar to that of stones. The stones 12 and beads 13 are provided within and without the decorative feature 16. Each stone 12 is set on the face 14 of the ring 10, for example in prongs provided at the stone seat of each stone 12.

Figure 2:
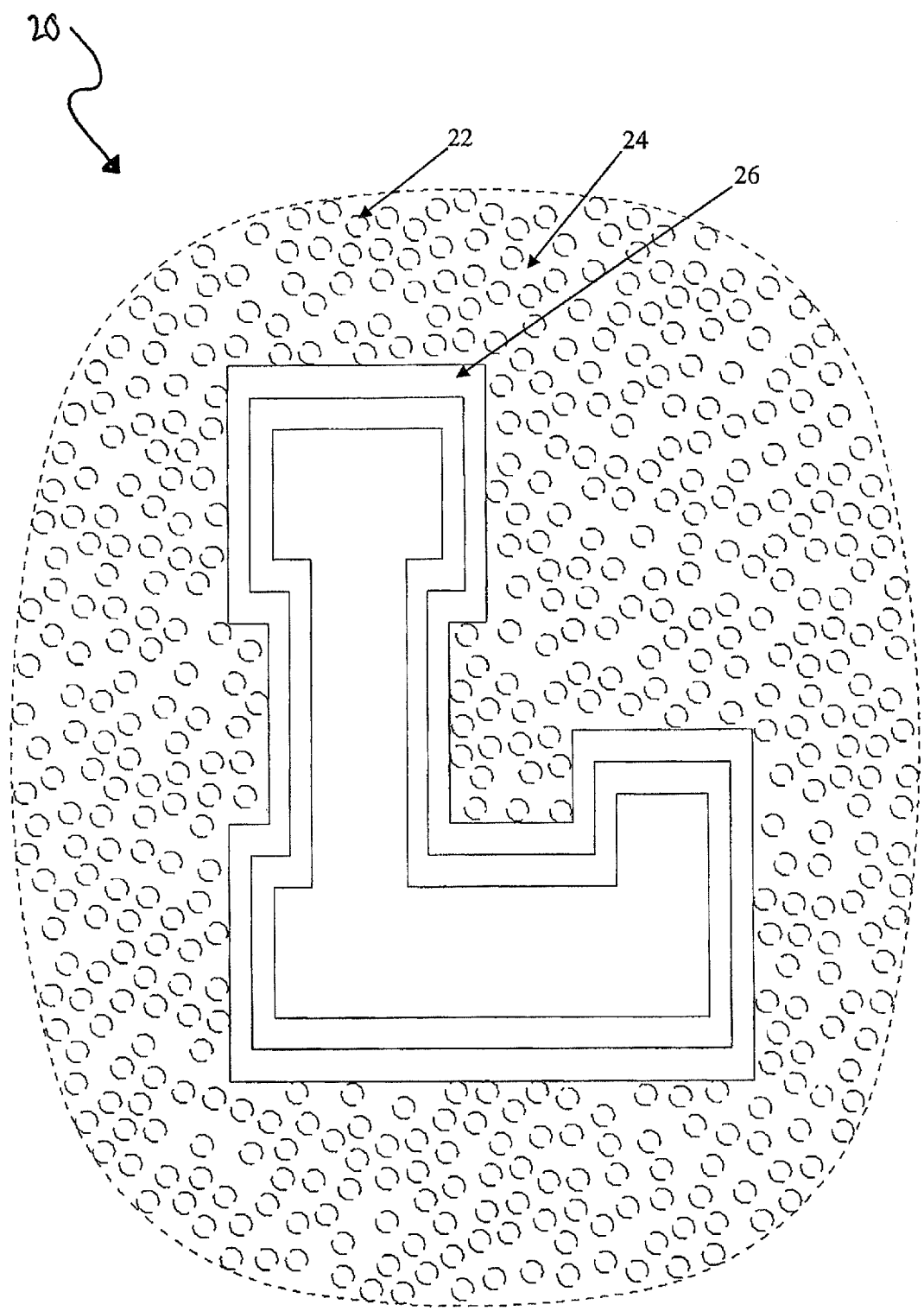
FIG. 2 illustrates a ring having a decorative feature and a plurality of beads on the face thereof.

FIG. 2 illustrates a ring 20 having a decorative feature 26 and a plurality of beads 22 on its face 24. In the embodiment of FIG. 2, the beads substantially fill the face 24 outside of the decorative feature 26. Stones and beads may be referred to interchangeably throughout this description and such discussion is intended to cover both as well as other types of embellishments.

While the present disclosure makes specific reference to rings, it will be understood by those skilled in the art that portions of the disclosed method may be used to embellish any type of jewelry and may further be extended into other areas. Further, the method disclosed herein may be used for producing random patterns in a confined region on other items. For example, the method may be applied to diplomas, announcements, and other printed materials. Objects being embellished may comprise any surface including planar surfaces and/or curved surfaces, or any solid including faceted solids and triangulated models. As used herein, the term "embellishment" may refer to any feature placed on a surface of an item, including, for example printed features, physical features such as beads or stones, and others.

Figure 3:
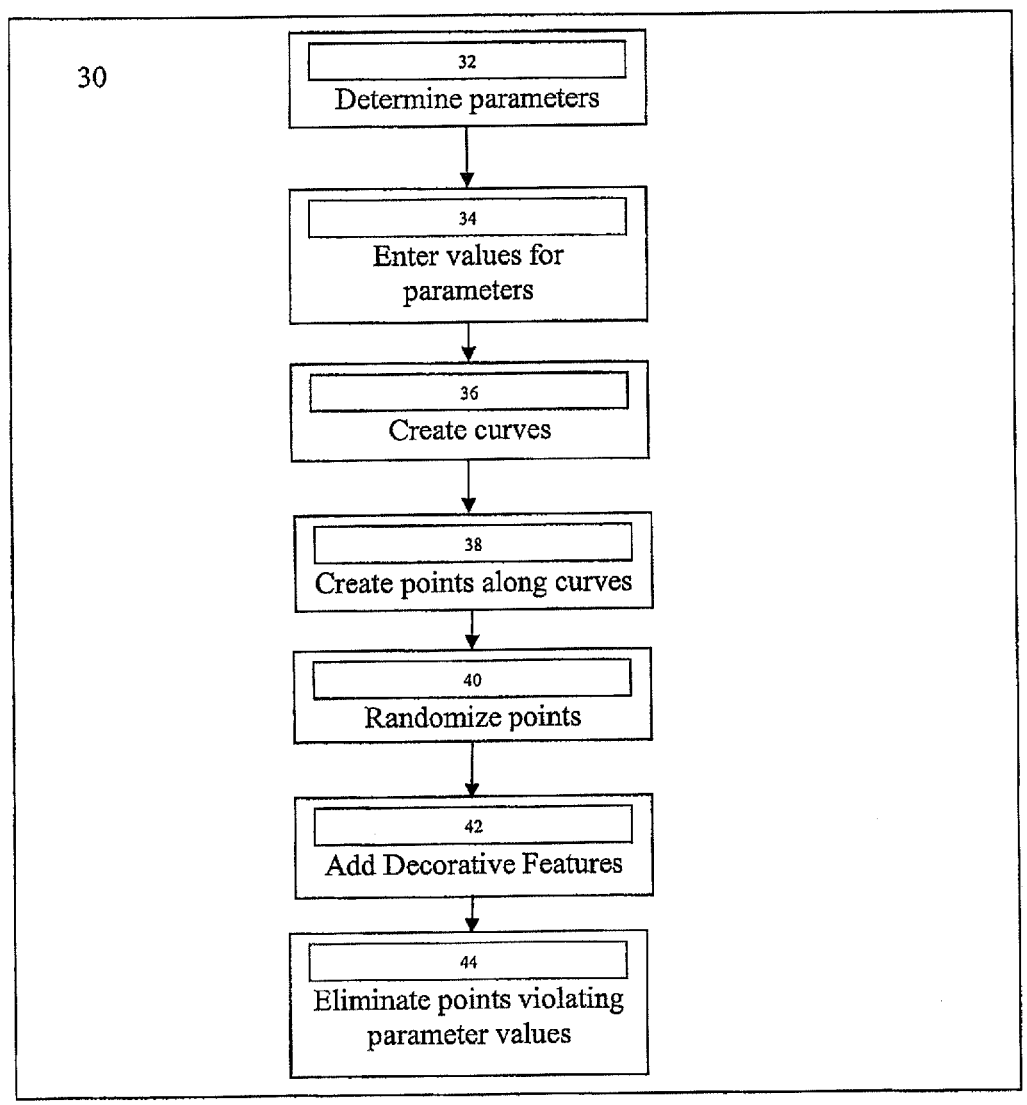
FIG. 3 illustrates workflow diagram of an automated method for determining embellishment placement in accordance with one embodiment.

FIG. 3 is a workflow diagram illustrating an automated method 30 of determining embellishment placement in accordance with one embodiment. As shown, parameters are determined regarding positioning of the embellishments [block 32]. Next, values for each parameter are entered [block 34]. Points are set on the item. Setting of the points may comprise creating offsets or curves along the portion of the item to be embellished [block 36] and setting points along the offsets [block 38]. These points are randomized [block 40]. Decorative feature(s), such as a large central stone, a letter or icon, or other, may be added [block 42]. Based on the added decorative feature(s) and the parameter values, points may be eliminated [block 44]. After points violating the parameter values have been eliminated, the remaining points comprise positions for embellishments. Because the method produces random placement of the embellishments, after positions have been established, the data may be compacted to open space for more positions.

Each of the steps of FIG. 3 will now be discussed in more detail.

With specific reference to determining parameters regarding positioning of embellishments [block 32] and entering values for each parameter [block 34], such parameters may be, for example, relative distances of the embellishments to other features of the item. For example, one parameter may be the distance of one embellishment to another. This may be referred to as $d_0$. Another parameter may be the distance of an embellishment to a center boundary (for example, the center boundary 58 shown in FIG. 4). This may be referred to as $d_1$. Another parameter may be the distance of an embellishment to prongs of a stone (shown at 60 of FIG. 4) or to other feature of the item. This may be referred to as $d_2$. Yet another parameter may be the distance of an embellishment to a stone seat (shown at 62 of FIG. 4). This may be referred to as $d_3$. Depending on the item being embellished, other parameters may be used. Further, not all of these parameters may be used.

Figure 4:
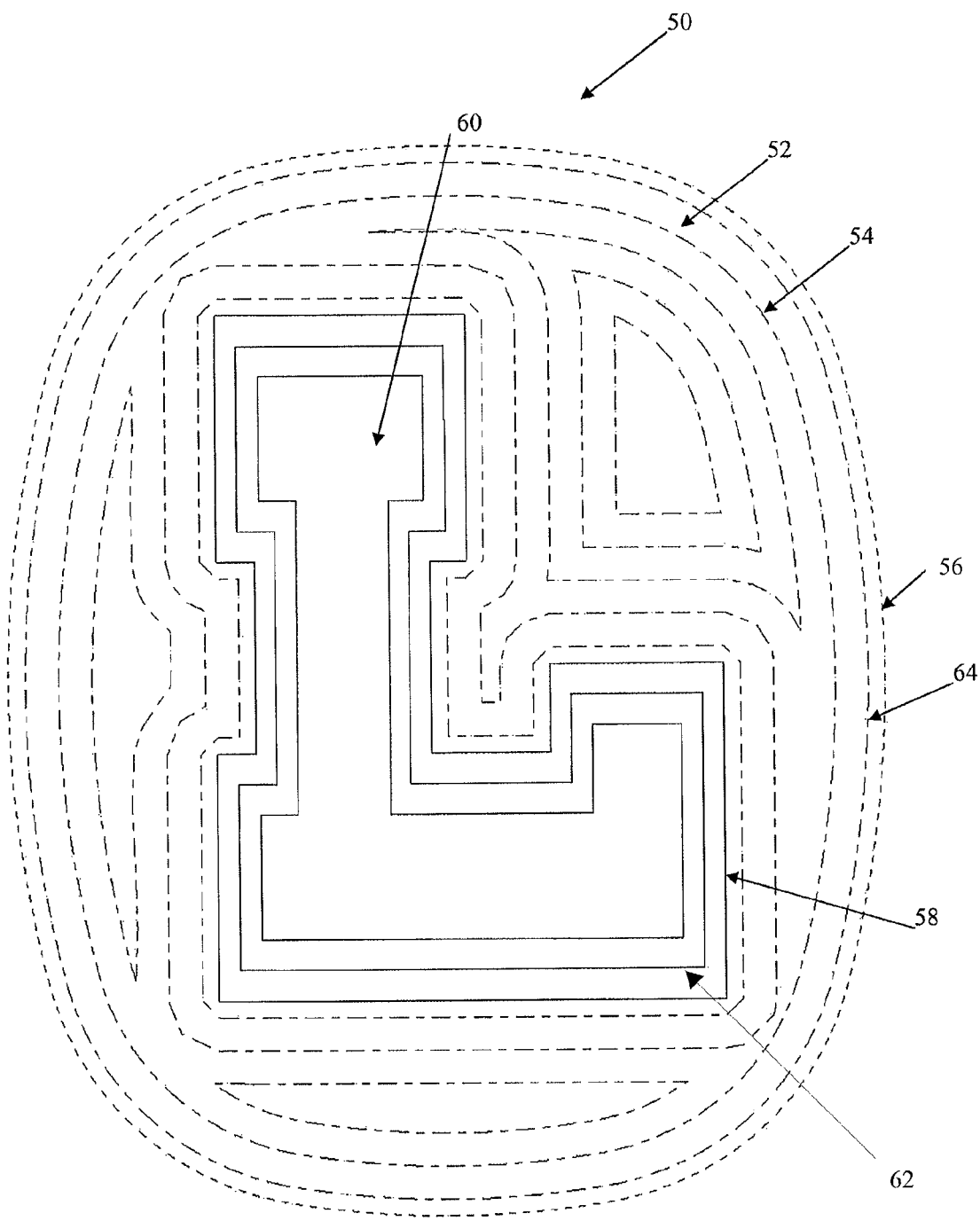
FIG. 4 illustrates the face of a jewelry item.

Reference is made to FIG. 4 regarding the creation of offsets or curves (block 36 of FIG. 3). FIG. 4 illustrates the face 52 of an item 50. The offsets or curves 54 are made around the perimeter 56 and center boundary 58 of the item 50. These offsets or curves 54 may be uniformly spaced from one another, randomly spaced from one another, or pseudo randomly spaced from one another. In the embodiment of FIG. 4, the offsets or curves 54 are uniformly spaced from one another. Generally, the curves may be set based on the parameter $d_1$, the distance of any embellishment to the center boundary 58.

As shown in FIG. 4, points 64 are set along each of the offsets or curves 54 (block 38 of FIG. 3). These points 64 are generally set uniformly along the offsets or curves 54. For example, the points 64 may be provided spaced every 1/1000 or 5/1000 of an inch along each offset or curve 54. In alternative embodiments, the points 64 may be set randomly or pseudo-randomly. These points 64 comprise data relating to embellishment placement. At creation, these points 64 may be numbered sequentially. Thus, the first point along a curve may be numbered 1, the next numbered 2, etc. Randomizing the points 64 (block 40 of FIG. 3) may comprise shuffling the numbering of the points 64.

Figure 5:
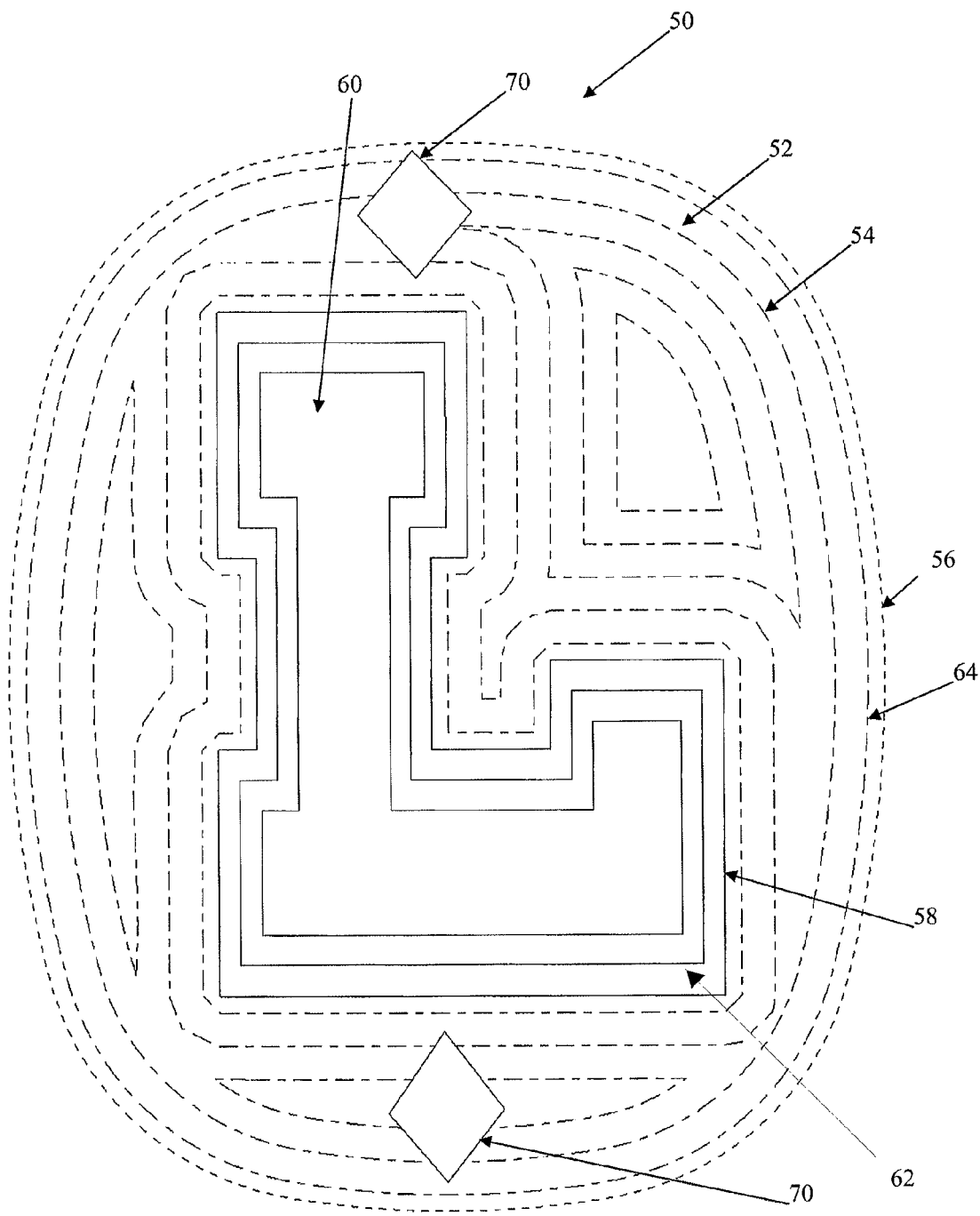
FIG. 5 illustrates the face of a jewelry item having curves and points superimposed thereupon in accordance with one embodiment.

FIG. 5 illustrates decorative features 70 of the jewelry item 50 added over the offsets or curves 54. Points 64 are eliminated based on the added features 70 as violating set parameter values (block 44 of FIG. 3). Specifically, a data structure may be used to track features 70 and points 64 and compare the points 64 (or curve data) to the set parameters ($d_0$, $d_1$, $d_2$, $d_3$, etc.). Any points that violate the set parameters are eliminated. With respect to $d_0$, the distance of one point to another, the points are eliminated sequentially, for example, in number order. Thus, if point 2 violates $d_0$ with respect to its position to point 1, point 2 is eliminated. Because the points are randomly numbered, the points are eliminated randomly based on $d_0$ and such elimination will appear random. Generally, as many points as possible given the values set for the parameters will remain. After points violating the parameter values have been eliminated, the remaining points comprise positions for embellishments.

Any data structure may be used for tracking the points and comparing the points to the set parameters. For example, the data structure may be a tree, a data structure for bucket sorting, or another data structure. The type of data structure (and data) used sets whether algorithms for tracking and eliminating the points are two-dimensional or three-dimensional. For a three-dimensional structure, the data may be projected onto a surface.

Other factors may be input depending on the embellishment. For example, for stone embellishments, the number of stone seats, the total carats, the order of stone placement (for example, placement of large stones, then placement of small stones) may be input. These factors may be incorporated into algorithms used by the data structure. Stones are frequently set within prongs. Using the method to determine stone placement, the method may further include changing orientation of the prongs to fit more stones.

Generally, the description herein has related to embellishment placement on a substantially two dimensional substrate. As can be appreciated by one skilled in the art, the system and method for embellishment placement may further be applied to three dimensional objects or substrates.

After positions for embellishments have been determined, such positions may be used to generate a tool path for creation of the item or may be used in a rapid prototyping process.

Although the invention has been described with reference to preferred embodiments, persons skilled in the art will recognize that changes may be made in form and detail without departing from the spirit and scope of the invention.

What is claimed is:

1. A method of determining positions for embellishment placement on an item and manufacturing of the item, the method comprising:
   receiving a parameter value defining a minimum distance between an embellishment and another feature of the item;
   defining points on the item;
   randomizing the points, wherein randomizing the points comprises numbering the points and shuffling the numbers of the points;
   eliminating one or more points based on the parameter value and leaving remaining points, the remaining points defining the positions for embellishments on the item; and
   manufacturing the item with embellishments positioned at the remaining points.

2. The method of claim 1, wherein the parameter value is the distance of one embellishment to another.

3. The method of claim 1, wherein the parameter value is the distance of an embellishment to a boundary around a center of the item.

4. The method of claim 1, wherein the parameter value is the distance of an embellishment to a decorative feature of the item.

5. The method of claim 1, wherein defining points on the item comprises creating offsets along the item and setting points along the offsets.

6. The method of claim 5, wherein the offsets are uniformly spaced from one another.

7. The method of claim 5, wherein the offsets are spaced between a perimeter of a portion of the item to be embellished and a center boundary of the portion of the item to be embellished.

8. The method of claim 5, wherein the points are defined uniformly along the offsets.

9. The method of claim 5, wherein the points are defined randomly along the offsets.

10. The method of claim 1, further comprising placing decorative features on the item.

11. The method of claim 10, further comprising eliminating points based on the parameter value and the decorative features.

12. The method of claim 1, wherein the parameter value is the distance of one embellishment to another and wherein eliminating points based on the parameter value comprises eliminating points based on number order.

13. The method of claim 1, further comprising inputting data regarding the embellishment.

14. The method of claim 1, further comprising compacting the remaining points.

15. The method of claim 14, further comprising determining positions for further embellishments in space opened by compacting the remaining points.

\* \* \* \* \*